United States Patent [19]

Pfister et al.

[11] 4,182,067

[45] Jan. 8, 1980

[54] FISH LURE

[76] Inventors: Charles W. Pfister; Charles W. Pfister, Jr., both of 211 N. Ashland Ave., Park Ridge, Ill. 60068

[21] Appl. No.: 869,378

[22] Filed: Jan. 13, 1978

[51] Int. Cl.² ............................................ A01K 85/00
[52] U.S. Cl. .................... 43/42.22; 43/42.3; 43/42.47
[58] Field of Search ............... 43/42.22, 42.48, 42.53, 43/42.47, 42.28, 42.3, 42.33

[56] References Cited

U.S. PATENT DOCUMENTS

| 2,515,018 | 7/1950 | Parnell | 43/42.3 |
|---|---|---|---|
| 2,523,831 | 9/1950 | Koski | 43/42.3 X |
| 2,525,733 | 10/1950 | Suick | 43/42.48 X |
| 2,598,771 | 6/1952 | Eder | 43/42.22 X |
| 2,694,876 | 11/1954 | Grasser | 43/42.47 X |
| 2,766,544 | 10/1956 | Silverthorne | 43/42.48 X |
| 3,090,152 | 5/1963 | Helin | 43/42.47 |
| 3,296,734 | 1/1967 | Johnson | 43/42.3 X |

*Primary Examiner*—Nicholas P. Godici
*Attorney, Agent, or Firm*—Wallenstein, Spangelberg, Hattis & Strampel

[57] ABSTRACT

A fish lure comprising an elongated, rearwardly tapering body portion having a head end and a tail end, and a plurality of hooks depending from the bottom thereof. The body portion has a bottom recess formed at its head end which provides a water engaging surface for imparting a life-like action to the lure as it is drawn through water by a line attached to the head end of the lure. The tail end of the body portion is provided with a thin, flat, flexible tail-like diving fin which can be bent upwardly or downwardly, as desired, to regulate the depth at which the lure dives through water as the lure is retrieved, as by a jerking action, through water. The tail-like fin is adapted to support an outrigger assembly which, in its preferred form, comprises a pair of wire-like members which diverge outwardly and rearwardly from the tail-like fin, and have hooks attached to the free ends thereof. The outrigger assembly provides a wake pattern as the lure moves through the water which acts to attract fish, and, in addition, increases the hook carrying capacity of the lure thereby enhancing the ability of the lure to hook a fish when the lure is struck by a fish from substantially any direction.

12 Claims, 8 Drawing Figures

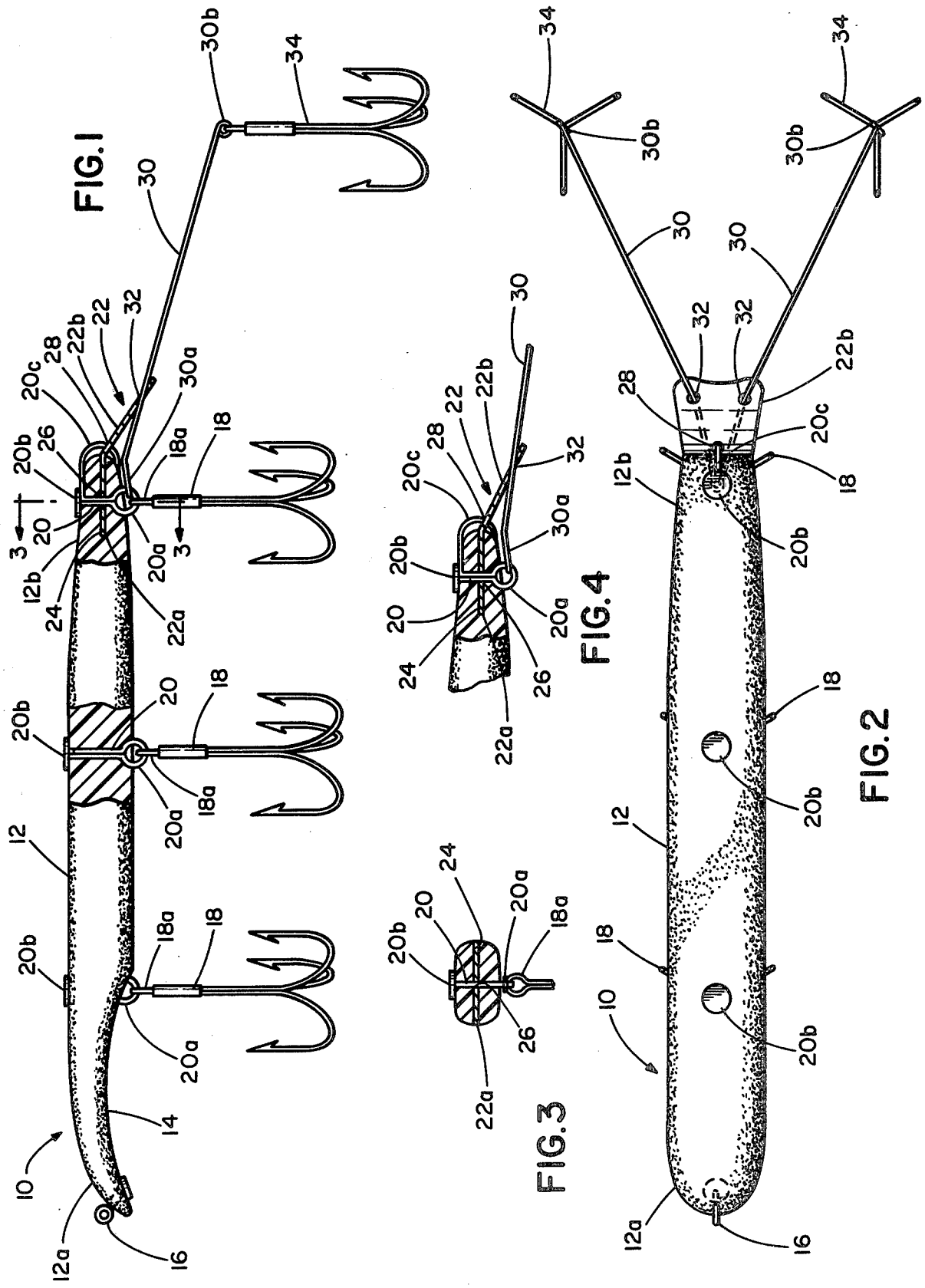

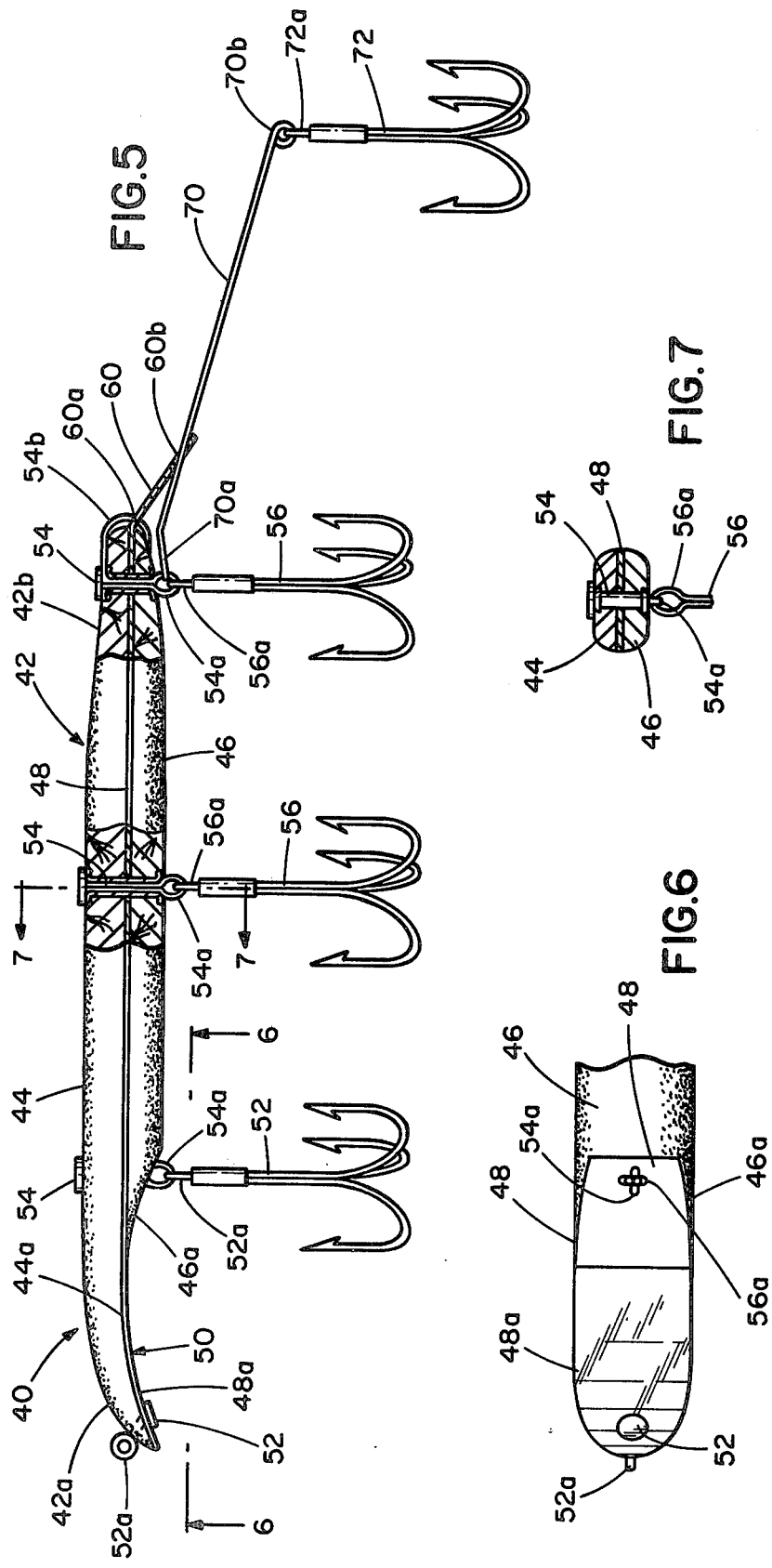

FISH LURE

The present invention relates to an improved fish lure of the type especially useful for catching larger fresh water fish such as the muskellunge and other large pike.

Fish lures intended for use in catching fish such as muskellunge (muskie) have taken various forms. Exemplary of a lure intended for use as a muskie bait is the one disclosed in U.S. Pat. No. 2,525,733. As shown in that patent, the bait comprises an elongated, tapered body having a distinctly wider head end than tail end. The lower side of the head end is recessed, and a plurality of multiple barbed hooks are suspended from the bottom of the body. A rearwardly extending strap and a separate, rearwardly extending tail piece are secured in the tail end of the body. A screw is threaded through the distal end of the strap and engages the upper surface of the tail piece whereby the angle of inclination of the tail piece can be varied to control the weaving and diving movement of the bait as it is drawn through water. While the bait shown in U.S. Pat. No. 2,525,733 has gained some recognition as a muskie bait, it has been found to have certain shortcomings, particularly with regard to the wake-producing action of the bait as it is drawn through the water, and, also, with regard to the limited sphere of effectiveness of the hook array carried by the bait which can result in its failure to hook a fish upon being struck.

In accordance with the present invention, an improved fish lure of the type disclosed in U.S. Pat. No. 2,525,733 has been evolved which provides both enhanced fish-attracting action as it is drawn through water, and a hook carrying arrangement which appreciably increases the capability of the lure to hook a fish when the lure is struck by a fish from substantially any direction.

The improved fish lure of this invention, like the fish bait shown in the aforementioned patent, preferably has an elongated, tapered body portion having a head end and a tail end. Also, as in the case of the fish bait of the patent, the preferred fish lure of this invention has a recess provided in the bottom of the body portion at the head end thereof, and a plurality of hooks, preferably triple hooks, are suspended in spaced relation from the bottom of the body portion. The tail end of the body portion of the fish lure of this invention also has an outwardly extending, flat, tail-like diving fin, but, unlike the tail of the fish bait of U.S. Pat. No. 2,525,733, need not rely upon a strap and adjustable screw arrangement, as shown in the patent, to regulate the depth to which the lure will dive as it is being drawn through water. The tail-like fin of the fish lure of this invention is simply bent, by means of the user's fingers, upwardly or downwardly to control the depth to which the lure will dive during normal retrieval, or during trolling. The unique fish-attracting action of the fish lure of the present invention, and its improved capability for hooking a striking fish are achieved by providing an outrigger assembly for the lure. In its preferred form, the outrigger assembly comprises a pair of elongated, wire-like members which pass through openings in the flat tail-like fin, and diverge outwardly and rearwardly therefrom. The inner ends of the wire-like members of the assembly advantageously are secured to the bottom of the body portion at the tail end thereof. The outer, free ends of the wire-like members each are adapted to carry a hook, preferably a triple hook. The length of the wire-like members, and the extent of their rearward divergence from the tail-like fin provides a wake pattern behind the body portion of the lure as it moves through water which is attractive to large fish such as muskie. As the same time, the hooks positioned on the outer ends of the lure provide an increased area of vulnerability of a fish to being hooked when it strikes the lure from substantially any direction. In a modification of the lure, especially in those instances where the body portion is fabricated of wood, a reinforcing strip or plate is provided for the lure to prevent "bite-through" by a muskie or other large fish which may strike the lure from the side, for example. The reinforcing plate can be of sufficient length such that an end thereof can be shaped to form the tail-like fin at the rear of the body portion, and the other end can extend part-way along, or cover, the surface of the recess at the head end of the body portion to provide a light reflecting surface which is attractive to fish.

The foregoing, and other features and advantages of the fish lure of this invention will become clear to those skilled in the art from the following description when taken in conjunction with the accompanying drawings wherein:

FIG. 1 is a side view in elevation, partly in section, of an embodiment of a fish lure of this invention;

FIG. 2 is a plan view of said embodiment of the fish lure;

FIG. 3 is a fragmentary sectional view taken substantially along line 3—3 of FIG. 1;

FIG. 4 is a fragmentary side view, partly in section, of the tail end of the embodiment of the lure shown in FIG. 1 showing the tail-like fin bent at a different angle to control the depth at which the lure is drawn through water;

FIG. 5 is a side view in elevation, partly in section, of another embodiment of the fish lure of the present invention;

FIG. 6 is a fragmentary bottom sectional view of the head end of the lure taken substantially along line 6—6 of FIG. 5;

FIG. 7 is a fragmentary sectional view taken substantially along line 7—7 of FIG. 5; and FIG. 8 is a side view illustrating the preferred "sawtooth" path taken by the lure as it is drawn through water during retrieval.

As shown in FIGS. 1 and 2 of the drawings, the fish lure, designated generally by reference numeral 10, in one of its forms, comprises an elongated, gently rearwardly tapered body portion 12, having a head end 12a and a tail end 12b. The body portion 12 may be fabricated of plastic, a lightweight metal such as aluminum, or wood. The head end 12a of the body portion 12 is provided with an upwardly curved or arched bottom recess 14 which extends rearwardly from the tip of the head portion 12a to a point approximately one-third the length of the body portion 12 back from the tip of the head portion 12a. The recess 14 provides a water intercepting surface which imparts a life-like motion to the lure 10 as it is drawn through water. An eye 16 for attaching a fish line to the lure 10 is secured to the head end 12a at the top, and rearwardly of, the tip thereof.

The body portion 12 has a plurality of triple hooks 18 suspended from the bottom thereof by means of rivets 20 which extend through the body portion 12 and have an eye 20a formed at the lower end thereof for receiving the eye 18a of the hooks 18 and an enlarged head 20b which abuts the top surface of the body portion 12 and prevents the rivets 20 from being dislodged from the body portion 12. The hooks 18 are evenly spaced along the body portion 12 to give the lure proper balance, and extend from a point at the rear of the bottom recess 14 at the head end 12a of the body portion to a point forward of the tip of the tail end 12b of the body portion.

A thin, flexible, tail-like diving fin 22 is secured to the tail end 12b of the body portion. The fin 22, as shown, has an inner, body portion engaging panel 22a and an outwardly and rearwardly extending outer, flat fan-shaped panel 22b. The fin 22 desirably is fabricated of a corrosion resistant, resilient metal such as stainless steel, and is thin enough to enable the fan-shaped panel 22b of the fin to be bent upwardly or downwardly, as desired, by applying finger pressure, but is of sufficient thickness to enable the panel 22b to resist being bent to a position different from that set by the user as a result of pressure exerted upon the panel 22b by water as the lure is jerked, or otherwise pulled, through water. The inner panel 22a of the fin 22 is received in a longitudinal slot 24 formed in the tail end 12b of the body portion of the lure, and has an opening 26 therethrough for receiving the shank of the hook supporting rivet 20 provided at the tail end 12b. The fan-shaped panel 22b of the fin 22 has an opening 28 formed in it proximal to its juncture with the inner panel 22a of the fin 22 for receiving an extension 20c of the shank of the rearwardmost hook supporting rivet 20. As shown, the end of the extension 20c is curved in a manner such that it is embedded in the bottom of the tail end 12b of the body portion. This arrangement, coupled with the passage of the shank of the rearwardmost rivet 20 through the opening 26 in the inner panel 22a of the fin 22, securely anchors the fin 22 in position on the body portion and prevents dislodgement of the fin 22 from the body portion by any excessive forces placed thereon by a striking or hooked fish. As indicated hereinabove, the depth at which the lure will dive, or travel, as it is drawn through water, is controlled or regulated by bending the fan-shaped panel 22b of the fin 22 upwardly or downwardly. Thus, the greater the degree to which the panel 22b is bent downwardly, and, concomitantly, the smaller the angle formed between the panels 22a and 22b at the bottom of the fin 22, the greater the depth at which the lure will dive through water. Conversely, the lesser the degree to which the panel 22b is bent downwardly and, concomitantly, the larger the angle formed between the panels 22a and 22b at the bottom of the fin 22, the lesser the depth at which the lure will dive through water.

As stated, the unique fish attracting action, and the increased hook carrying capabilities of the lure of this invention are achieved with an outrigger assembly which extends outwardly and rearwardly from the tail end of the lure. As illustrated, the outrigger assembly comprises a pair of elongated, straight, wire-like members 30—30, the inner ends 30a—30a of which pass through openings 32—32 formed in the outer panel 22b of the fin 22 and are secured to the hook retaining eye 20a of the rearwardmost rivet 20. The members 30—30 advantageously are made of a relatively heavy gauge, corrosion resistant wire such as stainless steel wire. The openings 32—32 in the panel 22b are located at the rear, and proximal to lateral margins thereof, with the result that the wire-like members 30—30 diverge outwardly at an appreciable angle from the panels 22b of the fin 22. The distal or outer end 30b of each of the members 30—30 are formed into a loop or eye for receiving the eye of a triple hook 34. The length of the members 30—30, and the extent of the outward divergence thereof from the panel 22b of the fin 22, positions the triple hooks 34 an appreciable distance behind and to the side of the body portion 12 of the lure, and thereby increases the overall sphere of vulnerability of a striking fish to being hooked when attacking the lure from the rear or side. This arrangement, also, as indicated, creates a wake pattern to the rear and side of the body portion of the lure which is attractive to large fish such as muskie.

In FIGS. 5–7 of the drawings, an alternative embodiment of the fish lure of the present invention is illustrated. The lure, designated generally by reference numeral 40, comprises a body portion 42 having a head end 42a and a tail end 42b. The body portion 42, as shown, is formed of an upper section 44 and a lower section 46 having a reinforcing plate member 48 therebetween. This construction of the body portion of the lure is especially advantageous in preventing "bite-through" of the body portion of the lure by large aggressive fish such as muskie, and, as a result, substantially increases the useful life of the lure particularly in those instances where it is desired to use a natural material such as wood to form the body portion. Thus, as illustrated, the sections 44 and 46 are made of wood, while the plate member 48 is formed of metal, preferably a corrosion resistant metal such as stainless steel or aluminum.

The upper and lower sections 44 and 46, at the head end 42a of the lure, each are provided with a bottom recess 44a and 46a, respectively, which form a continuous arched bottom recess 50 at the head end 42a. The forward end 48a of the plate member 48 desirably extends into the recess 50, and is curved upwardly to follow the curvature of the recess 44a in the upper section 44 of the body portion. As best shown in FIG. 6, the forward end 48a of the plate member 48 acts as a light reflecting surface to attract fish, and is secured to the upper section 44 by means of a rivet 52 positioned at the tip of the section 44. The rivet 52 is formed to provide an eye 52a to which a line is attached for pulling the lure through water.

The sections 44 and 46, and the plate member 48 are secured together by a plurality of spaced rivets 54, the shanks of which extend through openings in the sections 44 and 46, and the plate member 48. The lower end of each rivet 54 is formed into an eye 54a for receiving the eye 56a of triple hooks 56 carried by the body portion 42 of the lure. The head of each rivet 54 engages the top surface of the upper section 44, and prevents the triple hooks from being pulled away from the body portion.

The plate member 48, as illustrated, advantageously extends the entire length of the body portion 42, and is formed at the tail end 42b of the lure into a thin, flexible outwardly extending tail-like diving fin 60 corresponding in shape and dimensions to the fin 22 of the embodiment of the lure shown in FIGS. 1-4 of the drawings. Like the fin 22, the fin 60 has an opening 60a for receiving an extension 54b of the shank of the rivet 54 at the tail end 42b of the body portion 42. As in the case of the extension 20c of the shank of the rivet 20 in the embodiment of the lure shown in FIGS. 1-4 of the drawings, the end of the extension 54b is bent forwardly and is embedded in the tip of the lower section 46 at the tail end of the body portion.

The lure 40, like the lure 10, is provided with an outrigger assembly which extends outwardly and rearwardly from the tail end of the lure. As in the case of the lure 10, the outrigger assembly of the lure 40 comprises a pair of elongated, straight, wire-like members 70—70, the inner ends 70a of which pass through a pair of openings 60b formed in the fin 60. The ends 70a are secured to the triple hook retaining eye 54a of the rearwardmost rivet 54. The members 70, like the members 30 of the outrigger assembly of the lure 10 advantageously are formed of a relatively heavy gauge, corrosion resistant wire such as stainless steel wire. The members 70 diverge outwardly and rearwardly from the fin 60 at an appreciable angle, and the distal or outer ends thereof are formed into a loop or eye 70b for receiving the eye 72a of a triple hook 72. The outrigger assembly of the lure 40 functions in the same manner as the outrigger assembly of the lure 10.

In FIG. 8 of the drawing, there is illustrated in schematic form a preferred technique to be followed in retrieving the lure of the present invention. (The path shown in FIG. 8 would be made by the lure as it is being retrieved through water from left to right.) The saw-toothed path taken by the lure as it is retrieved is accomplished by first sharply pulling on the line attached to the lure to cause the lure to dive as represented by the solid lines 80. The depth to which the lure will dive as a result of this action is determined by the degree to which the fin at the tail end of the lure is bent downwardly. Tension on the line is then released, and the lure is allowed to float upwardly, momentarily, as represented by the broken lines 82. The sharp pulling action is then repeated, followed by release of tension on the line, until the lure has been retrieved. This method of retrieval, coupled with the unique wake action caused by the outrigger of the lure assembly appeals to large fresh water fish such as muskie, and makes the lure of this invention especially effective for catching such fish.

While the fish lure of this invention has been illustrated and described with relation to certain specific embodiments, it should be understood that various modifications in the form of said embodiments may occur to those skilled in the art without departing or deviating from the scope of the invention as set forth in the following claims.

What is claimed is:

1. In a fish lure comprising an elongated body portion having a head end and a tail end, a depth regulating member secured by the body portion at the tail end thereof and extending outwardly and rearwardly therefrom, and a hook carrying outrigger assembly extending from and at least partially supported by the depth regulating member, said assembly comprising a pair of elongated elements which diverge outwardly and rearwardly from the depth regulating member, each of said elements having at least one hook unit attached to the distal end portion thereof and serving to create a fish-attracting wake pattern rearwardly of the body portion of the lure as the lure is drawn through water.

2. In a fish lure according to claim 1, wherein the elongated elements of the outrigger assembly comprise a pair of members passing through spaced apertures in said depth regulating member which serve to maintain the members in spaced-apart, rearwardly diverging relation to one another and the inner ends of which are anchored on the portion of the lure.

3. In a fish lure according to claim 1, wherein the elongated members of the outrigger assembly comprise a pair of wire-like members, the inner ends of which are anchored to the body portion of the lure, and the flexible depth regulating member is provided with spaced openings therethrough through which the wire-like members of the outrigger assembly extend, said openings serving to maintain the wire-like members in spaced-apart, rearwardly diverging relation to one another.

4. In a fish lure according to claim 1, wherein the head end of the body portion is provided with an exposed light-reflecting member which substantially conforms to the contour of the bottom of the head end of the body portion of the lure.

5. In a fish lure according to claim 4, wherein the light-reflecting plate member and the depth regulating member are joined to a body portion reinforcing member which is positioned within the body portion along the longitudinal axis thereof.

6. The fish lure of claim 1 wherein said hook unit of each of said elements of said outrigger assembly is behind and clear of said depth regulating member so that the fish can obtain access to the hook unit from all horizontal directions.

7. In a fish lure comprising an elongated body portion having a head end and a tail end, and having a plurality of hooks depending therefrom, a body portion reinforcing member positioned within the body portion and extending longitudinally thereof for most of the length thereof, said reinforcing member having a depth regulating portion extending outwardly and rearwardly of the tail end of the body portion of the lure, and a hook carrying outrigger assembly extending rearwardly from the depth regulating portion of the reinforcing member, said assembly comprising a pair of elongated elements which diverge outwardly and rearwardly from said depth regulating portion, each of said elements having a hook attached to and depending from the distal end portion thereof and serving to create a fish-attracting wake pattern rearwardly of the body portion of the lure as it is drawn through water.

8. In a fish lure according to claim 7 wherein the body portion reinforcing member includes a light-reflecting portion which extends along the bottom of the body portion at the head end thereof.

9. The fish lure of claim 6 wherein each of said hook units dangles freely from said elongated elements and each comprise at least three hook elements which when the hook unit assumes the position solely under the force of gravity provides at least three vertically extending hooked ends located at three different angular positions as viewed from below the same so that the fish has similar access to said hooked ends when approaching the hooks from at least three different directions.

10. In a fish lure comprising an elongated body portion having a head end and a tail end and made of a non-metallic material, hook means attached to said body portion, and a body portion reinforcing metal member extending longitudinally for most of the length of the body portion for increasing the bite-through strength of the lure, the improvement wherein said reinforcing member has as an integral part thereof a rear depth-regulating projection extending outwardly and rearwardly of the tail end of the body portion of the lure, and said body portion of the lure comprises upper and lower sections between which extends said reinforcing metal member.

11. The fish lure of claim 10 wherein said reinforcing member includes an integral front light-reflecting portion which is exposed and passes along the bottom of the head end of the body portion.

12. The lure of claim 10 wherein there are a number of hook means extending from the bottom of the body portion of the lure at longitudinally spaced points therealong, said upper and lower sections of the body portion of the lure and said reinforcing member being secured together by respective anchoring means passing therethrough and to the bottom ends of which means said hook means are attached.

* * * * *